Aug. 11, 1964  W. M. LEEDS ETAL  3,144,592
ARRANGEMENT FOR CONTROLLING CIRCUIT CONTINUITY
Filed April 28, 1961  2 Sheets-Sheet 1

WITNESSES
Edward F. Possessky
Edwin L. Bassler

INVENTORS
Wintrop M. Leeds &
Bernard R. Johnson
BY D. J. Smith
ATTORNEY

United States Patent Office 3,144,592
Patented Aug. 11, 1964

3,144,592
ARRANGEMENT FOR CONTROLLING
CIRCUIT CONTINUITY
Winthrop M. Leeds, Forest Hills, Pa., and Bernard R. Johnson, Riverdale, N. Dak., assignors to Westinghouse Electric Corporation, East Pittsburgh, Pa., a corporation of Pennsylvania
Filed Apr. 28, 1961, Ser. No. 106,321
5 Claims. (Cl. 317—148.5)

The present invention relates to arrangements for controlling circuit continuity and more particularly to switching arrangements which can include one or more semiconductor devices.

There are many instances where it is desirable to control the continuity of a relatively high voltage or power circuit through the use of a relatively low voltage circuit. For one example, ordinary household circuits can be controlled in this manner so as to enable a low voltage, centrally located control panel to be provided for the purpose of switching any or all of the power circuit branches in the household. In this cited example, a safety advantage is obtained since the hazard of shock is limited with considerable probability to that associated with only the low voltage control circuitry.

With the use of electronic circuitry in the low voltage control circuit, operational durability and reliability can more readily be provided for the control or switching function than in the case where a mechanical switching arrangement is employed. This is true if, in operation, mechanical relations are minimized or eliminated altogether and particularly if an arrangement of semiconductive material including one or more semiconductor devices is employed to provide electronically or molecularly any or all of the circuit functions. Of course, it is necessary that actuating means be responsive to external command or control for operation of the low voltage circuit and, for the reasons just considered, it is desirable in many cases that the actuating means be non-mechanical so as to be durably effective.

Thus, it is an object of the invention to provide a novel arrangement for controlling the continuity of an electric circuit, with the arrangement including a unique and efficient actuator.

A further object of the invention is to provide a novel switch in which moving parts are minimized or eliminated altogether.

Another object of the invention is to enable a switching function to be performed when an object of suitable conductivity is bridged across spaced terminals of the actuator described in the first object.

It is another object of the invention to provide a novel switch which can be operated substantially without effort and substantially without any resulting noise.

An additional object of the invention is to provide a novel switching arrangement as described in the first object, with the arrangement also including an output relay having contacts which alternately notch in open and closed positions in response to successive operations of the actuator.

A further object of the invention is to provide a switching arrangement as described in the first object, with the arrangement also including a bistable combination of circuit elements being operable alternately to hold the contacts of an ordinary output relay in open and closed positions in response to successive operations of the actuator.

Another object of the invention is to provide a switching arrangement as described in the first object, with the arrangement also including a bistable combination of circuit elements being responsive to hold the contacts of an output relay in a closed position when one pair of terminals of the actuator are operated or bridged and being responsive to hold the relay contacts in an open position when another pair of terminals of the actuator are bridged.

An additional object of the invention is to provide a switching arrangement as described in the first object, with the arrangement also including a four region semiconductor switch being effective to operate the notching relay described in the third object.

Still a further object of the invention is to provide a switching arrangement as described in the first object, with the arrangement also including a semiconductor switch and a full wave rectifier which enables the semiconductor switch to be included directly in the power circuit which is to be switched or controlled.

Another object of the invention is to provide a switching arrangement as described in the first object, including in affixed relationship with the actuator physically spaced and electrically separate terminals which can be bridged, for actuating purposes, by a member of suitable conductivity, for example one's finger, with the bridging current being less than that amount which would occasion a feeling of shock.

These and other objects, features, and advantages of the invention will become more apparent upon consideration of the following detailed description along with the attached drawing, in which.

Figure 1:
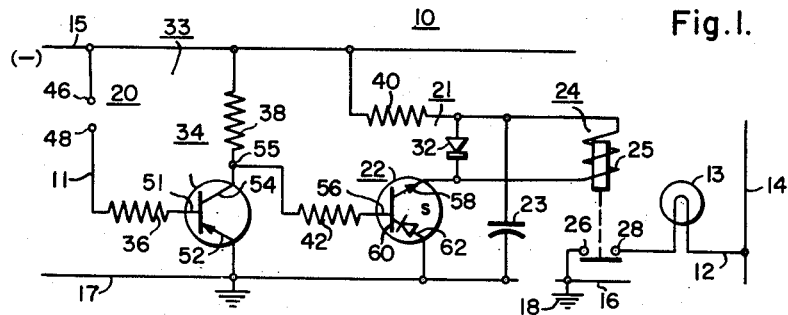
FIGURE 1 is a schematic diagram of a switching or control circuit which is arranged in accordance with the principles of the invention.

In accordance with the broad precepts of the invention, an arrangement of elements is provided for controlling the continuity of a power circuit, with the arrangement including an actuator having terminals which can be bridged by a suitable member, as mentioned previously, and a switching element or elements being responsive to bridging operations of the actuator so as to control the continuity of the power circuit. Thus, there is shown in FIGURE 1 a circuit arrangement 10 which is provided for the purpose of controlling the continuity of a power circuit branch 12 which includes a load device 13, such as an ordinary lamp. The circuit branch 12 is connected between lines 14 and 16 of a relatively high voltage source (not shown). In this case, the line 16 is grounded as indicated by the reference character 18 and the voltage provided by the noted source is a fluctuating or alternating one and may, for example, be of the magnitude of 110 or 220 or 440 volts.

Figure 4:
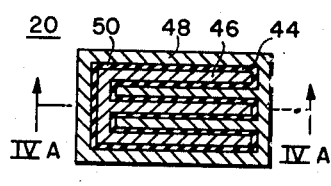
FIG. 4 is a top plan view, with cross-hatching to designate different materials, of an actuator constructed in accordance with the principles of the invention.

The circuit 10, having lines 15 and 17 energizable by a direct voltage source (not shown) of the polarity shown and of the magnitude for example of 24 volts, includes actuating means or an actuator 20 (shown in structural detail in FIGURE 4) in a circuit branch 11 between the lines 15 and 17. It also includes switching means 21 comprising here a semiconductor switching device or a controlled PNPN load switch 22 (or NPNP or PNPM or NPNM, if desired) and a capacitive element 23 for energizing a conventional notching relay 24 through the load switch 22. As will subsequently be described in greater detail, a current is enabled to flow through the load switch 22 and a serially connected coil 25 of the notching relay 24 each time the actuator 20 provides a signal current in response to external actuation, and, accordingly, relay contacts 26 and 28 included serially in the circuit branch 12 are alternately opened and closed in response to successive signals from the actuator 20. A diode 32 is placed in parallel with the relay coil 25 so as to enable stored energy in the coil 25 to be dissipated and therefore to avoid inductive "kicks" when current through the coil 25 is reduced to zero value by the operation of the load switch 22.

The switching means 21 of the circuit 10 also includes in this instance a semiconductor device 34, for example a PNP transistor, which responds as a switch to signals emanating from the actuator 20 with a predetermined energy level so as to provide the signals in amplified form for operating the load switch 22. Respective base and collector resistive elements 36 and 38 are provided for enabling the amplifying switch 34 to be operated from the lines 15 and 17, and a cathode resistive element 40 is provided for enabling the load switch 22 to be operated from the lines 15 and 17 while a gate resistive element 42 provides coupling from collector 54 of the device 34.

Figure 4A:
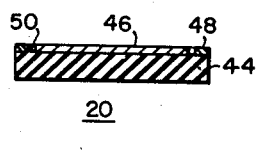
FIG. 4A is a cross-sectional view taken along the reference line IVA—IVA of FIG. 4.

The actuator 20 in its preferred form is free of moving parts. Thus, as viewed in FIGURES 4 and 4A, the actuator 20 includes an insulative plate 44, being adaptable for mounting on a wall for example, and spaced conductive means, in this example terminal strips 46 and 48. The terminal strips 46 and 48, which for economy and other reasons may be made with little thickness, are affixed to the plate 44, for example through the use of printed circuit techniques so as normally to be electrically discontinuous relative to each other when subjected to expected atmospheric or environmental conditions.

Accordingly, the terminal strips 46 and 48, in this example, are sufficiently spaced from each other along the adjacent surface of the plate 44, with a band 50 of insulative material therebetween, so as to enable the terminal strips 46 and 48 normally to be isolated electrically, yet are sufficiently close to each other so as to enable a limited portion of one's finger or fingers to serve as a conducting bridge thereacross. It follows clearly that, if the base resistor 38 of the amplifying switch 34 is accorded a suitable value, one can employ his finger or fingers to bridge the terminal strips 46 and 48 without experiencing any noticeable shock (as one example the bridging current may be limited to 10 microamperes principally by the resistor 38) and without preventing the amplifying switch 34 from functioning properly as a result of an insufficiently valued input signal current.

If objects or members having a higher conductivity (or lower resistivity) than one's finger were to be used to bridge the terminals 46 and 48, it is clear that the base resistor 38 can be adjusted in value to lead to rated operating currents for the amplifying switch 34. In addition, the normal discontinuity of the terminal strips 46 and 48, through the presence of the insulative band 50, exists to that degree which precludes the switch 34 from being actuated by any existing leakage current between the terminal strips 46 and 48. The amplifying switch 34 is therefore provided with sufficient sensitivity to respond to bridging signal currents yet is prevented from responding to any normally existing leakage current between the terminal strips 46 and 48.

In operation, when the terminal strips 46 and 48 of the plate 44 are bridged by an object of suitable conductivity, such as one's finger, a potential difference of forward polarity appears across an N-type base region 51 and a P-type emitter region 52 of the amplifying switch 34 so as to saturate the base region 51 with carriers and thereby enable a current to flow from the switch emitter region 52 to the P-type collector region 54 of the switch 34. Circuit junction 55 associated with the collector region 54 then approaches the potential of line 17 (in this case ground) so as to lead to an application of a potential difference across a P-type gate region 56 and an N-type cathode region 58 of the load switch 22. Accordingly, the gate region 56 and an adjacent N-type region 60 become saturated to enable the load switch 22 to become conductive (in particular, to enable a current to flow from a P-type anode region 62 to the cathode region 58). The collector resistor 38 of the load switch 22 limits the emitter-collector current of the amplifying switch 34 and the cathode resistor 40 and the gate resistor 42 limit the gate current through the load switch 22, in accordance with conventional design practices. In addition, the cathode resistor 40 is preferably selected to prevent the flow of any anticipated current equal to or greater than the minimum holding current of the switch 22.

Prior to the transfer of the load switch 22 to its conductive state, it is clear that the relay energizing capacitor 23 will have been charged substantially to the potential which exists across the lines 15 and 17. This being the case, when the load switch 22 is transferred to its conductive state in the manner already indicated, the capacitor 23 discharges through the switch 22 and the relay coil 25 so as to close or open the relay contacts 26 and 28, as the case may be, each time the actuator 20 is bridged.

When the net current through the load switch 22 drops below the characteristic holding value for the switch 22, as it is enabled to do because of the impeding effect of the cathode resistor 40 against current from the lines 15 and 17, the switch 22 becomes non-conductive so as to block the pre-existing switch current in a discontinuous manner. However, as previously indicated, the diode 32 immediately provides a path for local current through the relay coil 25 so as to dissipate stored energy of the latter and thereby to preclude the induction of elevated or "kick" voltages across the relay coil 25.

If the employed circuit parameters are such as to cause the discharge of the capacitor 23 to be over-damped, gate current through the switch 22, as a result of inadvertently continued bridging of the actuator 20, precludes the capacitor 23 from recharging and assuming a voltage which is sufficient to reactivate the load switch 22 once it has achieved open-circuit status. On the other hand, where the discharging capacitor 23 is slightly under-damped or oscillatory, reverse current is blocked by the switch 22 but is provided with a serial dissipative path through the diode 32 and the gate resistor 42 and with a dissipative path through the cathode resistor 40. In this condition of discharge, the capacitor 23 can again be precluded from reassuming a voltage which is sufficient to reactivate the switch 22 once it has been cut off regardless of continued bridging of the actuator 20.

Once the bridging object is removed from the actuator 20, its reapplication, subsequent to a recharging of the capacitor 23, leads to a sequence of circuit events identical with those just described, except that the relay contacts 26 and 28 then open if first closed or then close if first opened. Accordingly, control of the continuity of the power circuit branch 12 is provided by the low voltage circuit arrangement 10. The following data are presented to illustrate design parameters which may be employed in the circuit 10 of FIG. 1:

Rated current of P-N-P-N switch 22 in conductive state—1 ampere.
Gate current of P-N-P-N switch 22—1 milliampere.
Gain of P-N-P switch 34—100 emitter-base current; of P-N-P switch 34—10 microamperes.
Total resistance in emitter-base of switch 34 between lines 15 and 17

$$\frac{V_{15-17}}{I_{50-52}} = \frac{24}{10^{-5}} = 2.4$$

megohms, with the actuator 20 shorted out.

Figure 2:
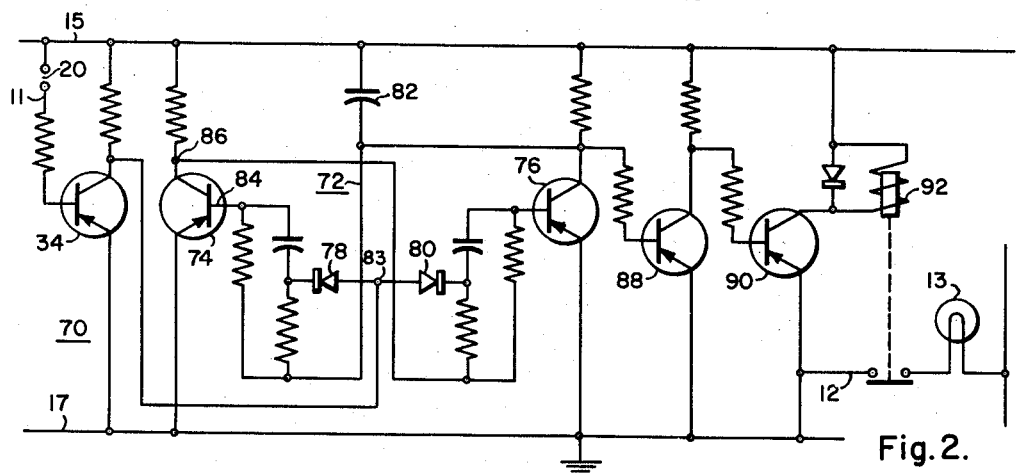
FIG. 2 is a schematic diagram of another switching or control circuit which is arranged in accordance with the principles of the invention.

Another embodiment of the invention is shown in FIGURE 2. The reference characters of FIGURE 2 are identical with those of FIGURE 1 where identical elements are employed. Thus, a circuit 70 includes the low voltage lines 15 and 17, the actuator 20 and the amplifying switch 34. Output signals from the switch 34 are delivered to a bistable or "flip-flop" circuit combination 72 including, in this example, a pair of PNP transistors 74 and 76 and a pair of signal directing diodes 78 and 80. A capacitive element 82 is provided to ensure that the transistor 74, rather than the transistor 76, first becomes conductive upon energization of the circuit 70 by the actuator 20. When the actuator 20 is bridged and the amplifying switch 34 becomes conductive, a junction 83 of the flip-flop circuit 72 is stepped approximately to ground potential, and the directing diode 78 steers the effect of the potential to a base 84 of the transistor 74 to drive the latter to a non-conductive condition.

Junction 86 in the flip-flop circuit 72 then acquires a negative potential approaching that of the line 15 so as to lead to a forward biasing of the emitter-base circuit of the transistor 76. Accordingly, the transistor 76 then becomes conductive and remains in this state until the actuator 20 is again bridged to reestablish, in a manner similar to that just described, a conductive state in the transistor 74 and the concomitant cut off state in the transistor 76.

Each time the transistor 76 is switched to a conductive state, a switch, for example a PNP transistor 88, is switched from a conductive state to a cut off state so as to lead to a conductive state in a load switch or PNP transistor 90. When the load switch 90 becomes conductive as a result of operation of the flip-flop circuit 72, an ordinary relay 92 becomes energized to close or to open the circuit branch 12, as the case may be, for operation of the load 13. It follows that successive bridgings of the actuator 20 lead alternately to opening and closing the circuit branch 12.

Figure 3:
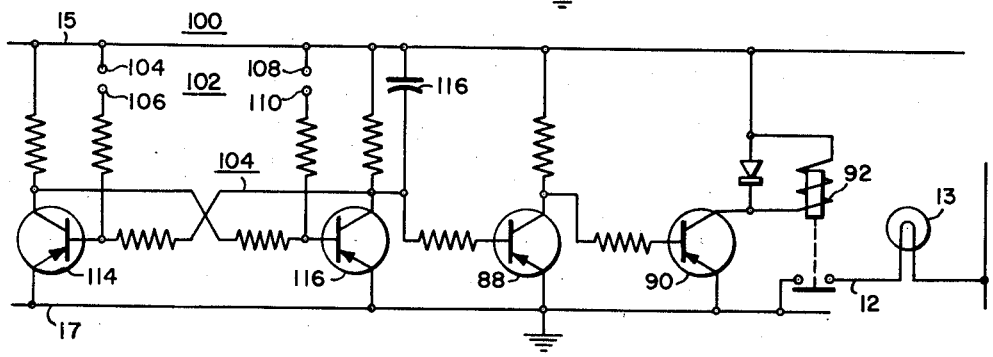
FIG. 3 is a schematic diagram of still another switching or control circuit which is arranged in accordance with the principles of the invention.
Figure 5:
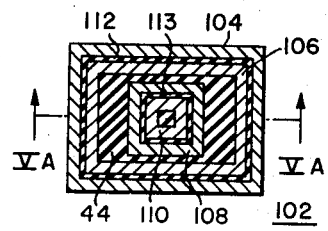
FIG. 5 is a top plan, with cross-hatching to designate different materials, of another actuator constructed in accordance with the principles of the invention.
Figure 5A:
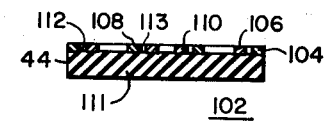
FIG. 5A is a cross-sectional view of the actuator of FIG. 5 taken along the reference line VA—VA.
Figure 6:
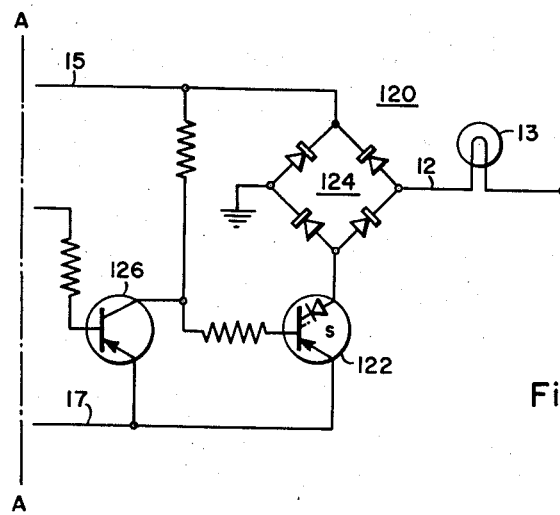
FIG. 6 is a schematic diagram of a portion of still another switching or control circuit arranged in accordance with the principles of the invention.

In FIGURE 3, another embodiment of the invention is schematically illustrated. In this case, a circuit 100 includes an actuator 102 (FIGS. 5, 5A) and a flip-flop or bistable circuit combination 104. The actuator 102 is similar to the actuator 20 of FIGURE 4, but includes two pairs of adjacent conductive terminal strips 104, 106 and 108, 110. Each pair of these terminal strips are formed on an insulative plate 111 and are spaced by insulative bands 112 or 113 similarly to the case of the actuator 20. The flip-flop 104, which is of conventional design, differs from the flip-flop 72 of FIGURE 2 in that each one of included transistors 114 and 116 becomes stably conductive only when its associated terminals 104, 106 or 108, 110 are bridged. In this manner, the load 13 can be turned on with a bridging of one pair of terminal strips 104, 106 or 108, 110 and can be turned off with a bridging of the other pair of terminal strips 108, 110 or 104, 106. A capacitive element 116 is provided, similarly to the case of FIG. 2, to ensure that the transistor 114 rather than the transistor 116 is initially in a conductive state. In other respects, where like reference characters are employed, the circuit 100 functions in a manner similar to the circuit 70 of FIG. 2.

Where it is preferred to avoid completely the use of electromechanical elements, such as the notching relay 24 or the ordinary relay 92, a control and supply circuit 120 as illustrated in FIGURE 6 can be employed. In this case a controlled semiconductor switch 122 (such as a PNPN device) is included as an effectively serial element in the circuit branch 12 through the use of a full wave bridge-type rectifier arrangement 124. Thus, when a transistor 126 becomes conductive in the circuit 120, a gating current is enabled to flow through the load switch 122. The switch 122 then becomes conductive so as to close the circuit branch 12, with the switch 122 conducting current unidirectionally as a result of the use of the rectifier 124 and with the load 13 being energized bi-directionally for reasons well known in the pertaining art. The control circuitry which, for obvious reasons, is to precede the reference line A—A in FIGURE 6 can be provided in the form shown in FIGURES 2 or 3, with the transistor 126 being equivalent to the transistor 88. In this case, independent grounding of the line 17 is neglected, but this may be accomplished, where desired, through the use of an isolation transformer and converting circuitry in a general manner well known to those skilled in the pertaining art.

In the foregoing description, the mode of operation of several physical arrangements has been related to point out the principles of the invention. The description, therefore has only been illustrative of the invention, and, accordingly, it is desired that the invention be not limited by the embodiments described here, but, rather, that it be accorded an interpretation consistent with the scope and spirit of its broad principles.

What is claimed is:

1. An arrangement for controlling the continuity of a power circuit, said arrangement comprising an actuator including at least one pair of spaced terminal elements, means for switching said power circuit between conductive and non-conductive states, said switching means including a semiconductor switching device being electrically related to said actuator so as to receive a switching signal current each time said actuator terminal elements are bridged by an object having a resistivity as high as the order of that of a path through one's finger, said switching means also including an output semiconductor switching device included serially in said power circuit and coupled to said first mentioned semiconductor device and responding to switch said power circuit each time the first-mentioned semiconductor device is switched, and means for providing unidirectional flow of current through said output semiconductor device.

2. An arrangement for controlling the continuity of a power circuit, said arrangement comprising an actuator including at least one pair of spaced terminal elements, means for switching said power circuit between conductive and non-conductive states, said switching means including a semiconductor switching device being electrically related to said actuator so as to receive a switching signal current each time said actuator terminal elements are bridged by an object having a resistivity as high as the order of that of a path through one's finger, said switching means also including an output semiconductor switching device included serially in said power circuit and coupled to said first-mentioned semiconductor device and responding to switch said power circuit each time the first-mentioned semiconductor device is switched, and a full wave rectifier included in said power circuit for providing unidirectional flow of current through said output semiconductor device.

3. A low voltage control circuit arrangement for controlling the continuity of a power circuit, said arrangement comprising an actuator connectable between a pair of low voltage lines and including at least one pair of spaced terminal elements, means for switching said power circuit between conductive and non-conductive states, said switching means including a semiconductor switching device electrically related to said actuator so as to receive a switching signal current each time said actuator terminal elements are bridged by an object having a resistivity as high as that of a path across one's finger, said switching means also including an output semiconductor switching device and a notching relay having contacts in said power circuit, and coupling means for enabling said switching device to energize said relay each time the first-mentioned semiconductor device is switched to one of a conductive and a non-conductive state, said relay thereby being operative alternately to open and close said power circuit each time the first-mentioned semiconductor device is switched.

4. A low voltage control circuit arrangement for controlling the continuity of a power circuit, said arrangement comprising an actuator connectable between a pair of low voltage lines and including at least one pair of spaced terminal elements, means for switching said power circuit between conductive and non-conductive states, said switching means including a semiconductor switching device electrically related to said actuator so as to receive a switching signal current each time said actuator terminal elements are bridged by an object having a resistivity as high as that of a path across one's finger, said switching means also including a bistable circuit combination having a first and a second semiconductor switching device, one of said first and second devices being normally in a conductive state, the first-mentioned semiconductor device being operative upon successive actuations thereof alternately and repeatedly to drive the other of said first and said second devices and then said one device into a conductive state, and said switching means including an output semiconductor switching device and relay having contacts in said power circuit responsive to switch said power circuit and to maintain the switched state of said power circuit each time said bistable circuit combination switches its state of stable conduction.

5. A low voltage control circuit arrangement for controlling the continuity of a power circuit, said arrangement comprising an actuator including an insulative plate and at least two pairs of spaced terminal strips affixed to said plate, means for switching said power circuit between conductive and non-conductive states, said switching means including a bistable circuit combination having first and second semiconductor switching devices, one of said first and second devices being normally in a conductive state, said bistable combination electrically related to said actuator so that said first and second switching devices are alternately switched to a conductive state in response to alternate bridgings of said pairs of terminal strips, each of said terminal strip pairs being bridgeable by an object having a resistivity as high as the order of that of a path through one's finger, and said switching means including an output semiconductor switching device and relay having contacts in said power circuit responsive to switch said power circuit and to maintain the switched state of said power circuit each time said bistable circuit combination switches its state of stable conduction.

References Cited in the file of this patent
UNITED STATES PATENTS 2,848,659     Cutler _____ June 10, 1955
3,027,467     Lipman _____ Mar. 27, 1962